(12) United States Patent
Radivojevic et al.

(10) Patent No.: US 9,110,507 B2
(45) Date of Patent: Aug. 18, 2015

(54) GENERATING PERCEPTIBLE TOUCH STIMULUS

(75) Inventors: Zoran Radivojevic, Cambridge (GB); Chris Bower, Ely (GB); Paul Beecher, Cambridge (GB); Piers Andrew, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 1068 days.

(21) Appl. No.: 12/856,069

(22) Filed: Aug. 13, 2010

(65) Prior Publication Data
US 2012/0038559 A1  Feb. 16, 2012

(51) Int. Cl.
*G06F 3/01*   (2006.01)
*G06F 3/0488* (2013.01)
*G06F 3/041*  (2006.01)

(52) U.S. Cl.
CPC ............... *G06F 3/016* (2013.01); *G06F 3/041* (2013.01); *G06F 3/0488* (2013.01); *G06F 2203/014* (2013.01)

(58) Field of Classification Search
CPC ....... G06F 3/016; G06F 3/041; G06F 3/0488; G06F 2203/014; G08B 6/00; H04M 2250/22
USPC .................. 345/173–184; 340/407.2; 715/702
See application file for complete search history.

(56) References Cited

U.S. PATENT DOCUMENTS

| | | | |
|---|---|---|---|
| 4,020,328 A | 4/1977 | Bradam .................. | 235/146 |
| 5,181,030 A | 1/1993 | Itaya et al. .................. | 341/20 |
| 5,709,219 A | 1/1998 | Chen et al. .................. | 128/782 |
| 5,869,791 A | 2/1999 | Young .................. | 178/20.01 |
| 6,655,792 B2 | 12/2003 | Benson et al. .................. | 347/86 |
| 7,111,495 B2 | 9/2006 | Rapp et al. .................. | 73/24.01 |
| 7,176,903 B2 | 2/2007 | Katsuki et al. .................. | 345/173 |
| 7,221,981 B2 | 5/2007 | Gliner .................. | 607/116 |
| 7,385,443 B1 | 6/2008 | Denison | |
| 8,626,283 B1 | 1/2014 | Zhou .................. | 607/3 |
| 2002/0022873 A1 | 2/2002 | Erickson et al. .................. | 607/117 |
| 2002/0149561 A1 | 10/2002 | Fukumoto et al. .................. | 345/156 |
| 2004/0095330 A1 | 5/2004 | Ling et al. .................. | 345/173 |
| 2004/0131998 A1 | 7/2004 | Marom et al. .................. | 434/236 |
| 2004/0207542 A1 | 10/2004 | Chang et al. .................. | 341/20 |

(Continued)

FOREIGN PATENT DOCUMENTS

DE  10 2009 029 796 B3   7/2010
EP           2 000 885 A1  12/2008

(Continued)

OTHER PUBLICATIONS

Bao, Oliver et al., TESLATOUCH: Electrovibration for Touch Surfaces, UIST '10, Oct. 4, 2010 (included as NPL in U.S. Appl. No. 13/092,564, filed May 21, 2010).*

(Continued)

*Primary Examiner* — Dwayne Bost
*Assistant Examiner* — Larry Sternbane
(74) *Attorney, Agent, or Firm* — Harrington & Smith

(57) ABSTRACT

Apparatus including a first surface electrode and an arrangement of second insulated surface electrodes; a display configured to display an image; and a controller configured to apply a potential difference between the first surface electrode and the arrangement of second insulated surface electrodes and configured to control at least a variation in the applied potential difference in dependence upon the displayed image.

24 Claims, 3 Drawing Sheets

(56) References Cited

U.S. PATENT DOCUMENTS

Figure 1:
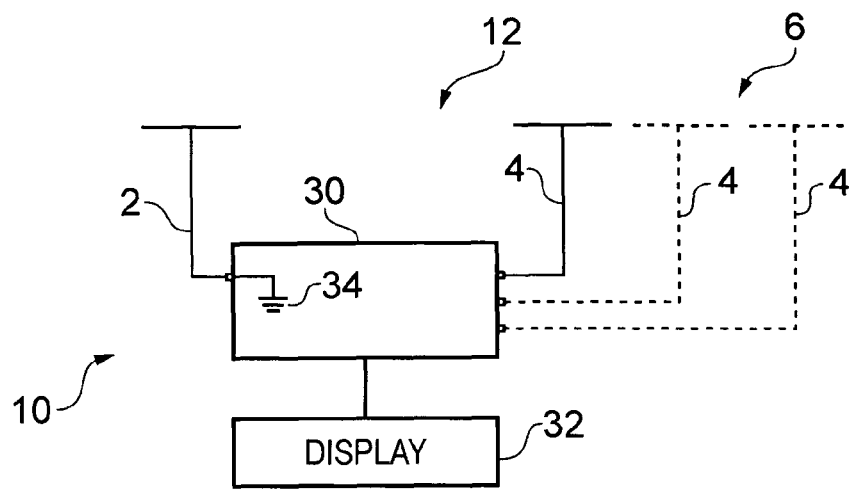

| | | |
|---|---|---|
| 2005/0131490 A1 | 6/2005 | Palanker ........................ 607/57 |
| 2005/0187454 A1 | 8/2005 | Gabl et al. .................... 600/372 |
| 2006/0061545 A1 | 3/2006 | Hughes et al. ................ 345/156 |
| 2006/0085049 A1 | 4/2006 | Cory et al. ...................... 607/48 |
| 2006/0085056 A1 | 4/2006 | Schouenborg ................ 607/148 |
| 2006/0149341 A1 | 7/2006 | Palti ................................ 607/48 |
| 2006/0241718 A1 | 10/2006 | Tyler et al. ...................... 607/45 |
| 2008/0062144 A1 | 3/2008 | Shahoian et al. ............. 345/173 |
| 2008/0157893 A1 | 7/2008 | Krah ........................ 331/177 R |
| 2008/0255434 A1 | 10/2008 | Hayter et al. ................. 600/309 |
| 2009/0002328 A1 | 1/2009 | Ullrich et al. ................. 345/173 |
| 2009/0079550 A1 | 3/2009 | Makinen et al. ........... 340/407.2 |
| 2009/0085878 A1 | 4/2009 | Heubel et al. ................ 345/173 |
| 2009/0128503 A1 | 5/2009 | Grant et al. ................... 345/173 |
| 2009/0167704 A1 | 7/2009 | Terilizzi et al. ............... 345/173 |
| 2009/0174671 A1 | 7/2009 | Tachi et al. ................... 345/173 |
| 2009/0243632 A1 | 10/2009 | Ozawa .......................... 324/679 |
| 2009/0293631 A1 | 12/2009 | Radivojevic ..................... 73/774 |
| 2009/0322496 A1 | 12/2009 | Da Costa ................... 340/407.2 |
| 2010/0079403 A1 | 4/2010 | Lynch et al. .................. 345/174 |
| 2010/0085169 A1 | 4/2010 | Poupyrev et al. .......... 340/407.2 |
| 2010/0152794 A1 | 6/2010 | Radivojevic et al. ............. 607/2 |
| 2010/0231550 A1* | 9/2010 | Cruz-Hernandez et al. ... 345/174 |
| 2010/0265210 A1 | 10/2010 | Nakanishi et al. ............ 345/174 |
| 2011/0032088 A1* | 2/2011 | Kim et al. .................. 340/407.1 |
| 2011/0037707 A1 | 2/2011 | Radivojevic et al. ......... 345/173 |
| 2011/0079449 A1 | 4/2011 | Radivojevic ............... 178/18.03 |
| 2011/0127880 A1 | 6/2011 | Murphy et al. ................ 310/317 |
| 2011/0279250 A1 | 11/2011 | Ryhanen et al. ........... 340/407.2 |
| 2011/0286156 A1 | 11/2011 | Beecher et al. .......... 361/679.01 |
| 2012/0038559 A1 | 2/2012 | Radivojevic et al. ......... 345/173 |
| 2012/0293441 A1 | 11/2012 | Eldering ........................ 345/173 |

FOREIGN PATENT DOCUMENTS

| | | | |
|---|---|---|---|
| JP | 2002149312 A | | 5/2002 |
| JP | 2004319255 A | | 11/2004 |
| JP | 2005/276089 A | | 10/2005 |
| JP | 2008/532564 A | | 8/2008 |
| JP | 2009087359 A | | 4/2009 |
| WO | WO 87/07825 A1 | | 12/1987 |
| WO | WO 2006/041648 A2 | | 4/2006 |
| WO | WO 2007/010441 A2 | | 1/2007 |
| WO | WO 2008/037275 A1 | | 4/2008 |
| WO | WO 2009/037379 A1 | | 3/2009 |
| WO | WO-2009037379 A1 | | 3/2009 |
| WO | WO 2009/141502 A1 | | 11/2009 |
| WO | WO 2009141502 A1 | * | 11/2009 |
| WO | WO 2009/158074 A1 | | 12/2009 |
| WO | WO 2010/066817 A2 | | 6/2010 |
| WO | WO 2010105001 A1 | * | 9/2010 |
| WO | WO 2010/124683 | | 11/2010 |

OTHER PUBLICATIONS

Nice, Karim, Tracy V. Wilson and Gerald Gurevich. "How Digital Cameras Work" Nov. 29, 2006. HowStuffWorks.com. <http://electronics.howstuffworks.com/cameras-photography/digital/digital-camera.htm> Feb. 19, 2013.*

Kaczmarek et al., "Polarity Effect in Elecrovibration for Tactile Display," Oct. 2006, IEEE Transactions on Biomedical Engineering, vol. 53 No. 10.*

Kaczmarek, et al., "Polarity Effect in Electrovibration for Tactile Display", NIH Public Access. Author Manuscript, IEEE Trans Boimed, (Oct. 2006), (pp. 1-17).

Peter B.L. Meijer, "Augmented Reality for the Totally Blind", Nov. 2010, (4 pages).

Yamamoto et al., "Electrostatic Tactile Display with Thin Film Slider and Its Application to Tactile Telepresentation Systems", IEEE Transactions on Visualization and Computer Graphics, vol. 12, No. 2, (Mar./Apr. 32006), (10 pages).

"Capacitively Coupled Electromagnetic Field Therapy as a Treatment Modality in Veterinary Medicine" http://www.scitechvet.com/articles.html, retrieved Dec. 30, 2008.

"Induced Current Constraints and Capacitive Effects in Inductive Nerve Stimulation"—McCarthy S, Haradem D, IEEE Transactions on Biomedical Engineering, vol. 37, Issue 6, Jun. 1990, pp. 598-605, http://ncbi.nlm.nih.gov/pubmed/2354841.

"Noninvasive Neuroelectronic Interfacing with Synaptically Connected Snail Neurons Immobilized on a Semiconductor Chip", Gunther Zeck, Peter Fromherz, PNAS Aug. 28, 2001 vol. 98 No. 18 10457-10462, http://www.pnas.org/content/98/18/10457.full.pdf+html.

"Capacitive Stimulatory Effect in Magnetic Stimulation of Nerve Tissue" Ueno S. Matsumoto S, Harada K, Oomura Y, IEEE Transactions on Magnetics, vol. 14, Issue5, Sep. 1978 pp. 958-960, http://ieeexplore.ieee.org/stamp/jsp?arnumber=01059800.

http://venturebeat.com/2008/05/30/startup-senseg-promises-game-changing-tactile-technology/—retrieved Jan. 12, 2009.

"Series E: Overall Network Operation, Telephone Service, Service Operation And Human Factors", ITU-T Recommendation E.161, Telecommunication Standardization Sector of ITU, Feb. 2001, 14 pgs.

http://www.nokia.com/about-nokia/research/demos/the-morph-concept; "Develop for Lumia", Feb. 25, 2014, 9 pgs.

* cited by examiner

GENERATING PERCEPTIBLE TOUCH STIMULUS

TECHNOLOGICAL FIELD

Embodiments of the present invention relate to haptics and the generation of perceptible touch stimulus.

BACKGROUND

Electromechanical actuators, such as vibration generators, are currently used to create a touch stimulus. However, they have a number of drawbacks.

BRIEF SUMMARY

According to some but not necessarily all embodiments of the invention there is provided an apparatus comprising: a first surface electrode and an arrangement of second insulated surface electrodes; a display configured to display an image; and a controller configured to apply a potential difference between the first surface electrode and the arrangement of second insulated surface electrodes, and configured to control at least a variation in the applied potential difference in dependence upon the displayed image.

According to some but not necessarily all embodiments of the invention there is provided a method comprising: displaying an image; applying a varying potential difference between a first surface electrode of an apparatus and an arrangement of second insulated surface electrodes of the apparatus; and controlling at least a variation in the applied potential difference in dependence upon the displayed image.

According to some but not necessarily all embodiments of the invention there is provided an apparatus comprising: a plurality of second insulated surface electrodes distributed over an area; a controller configured to apply a different potential difference at each of the plurality of second insulated surface electrodes and configured to control a spatial variation in the applied potential difference over the area to provide to a digit of a user a touch stimulus only when the digit is traced across the area, wherein the touch stimulus spatially varies across the area.

When the arrangement of second insulated electrodes and the display are co-located, an additional haptic layer is provided over a displayed image.

The conversion of an image into a texture can occur in real-time.

BRIEF DESCRIPTION

Figure 2A:
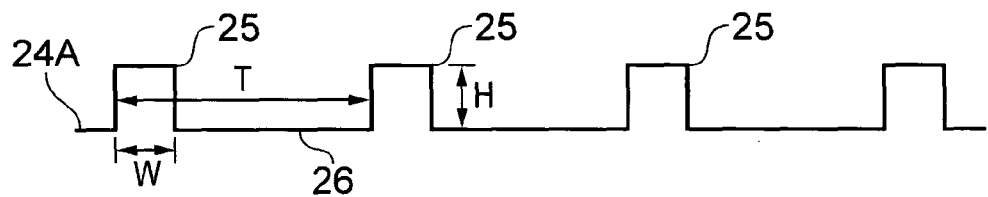
Figure 2B:
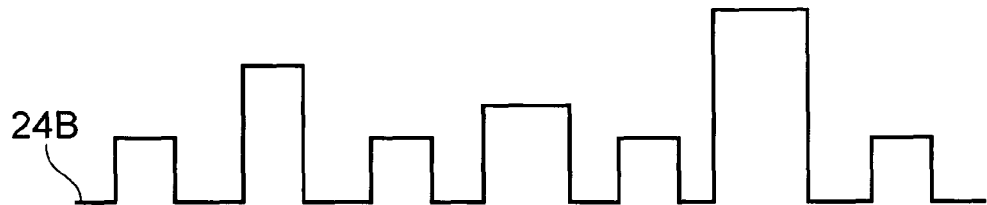
Figure 3:
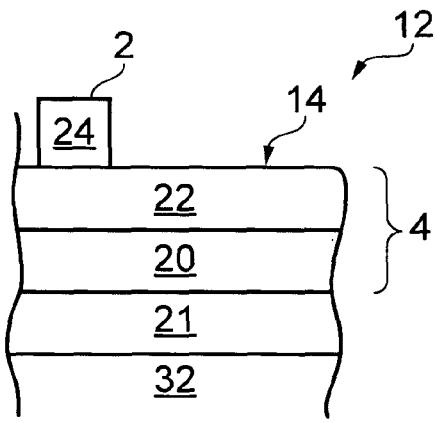
Figure 4:
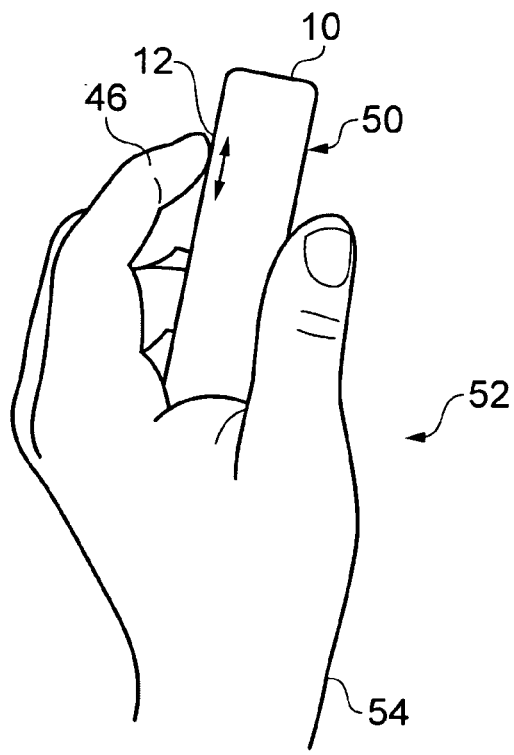
Figure 6:
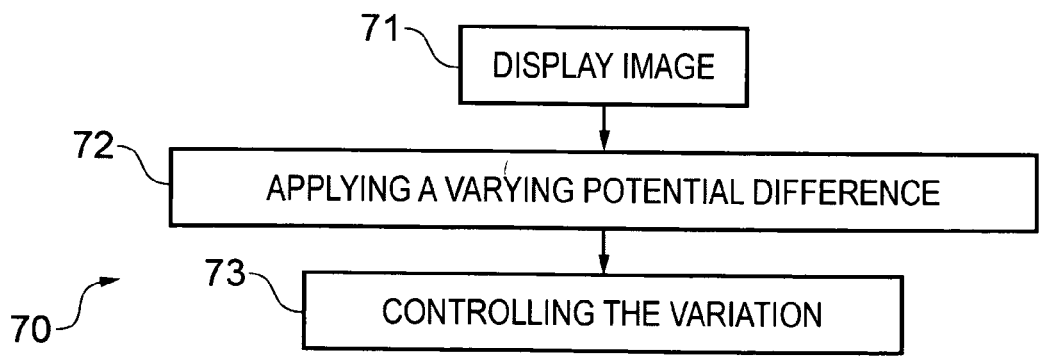
Figure 5:
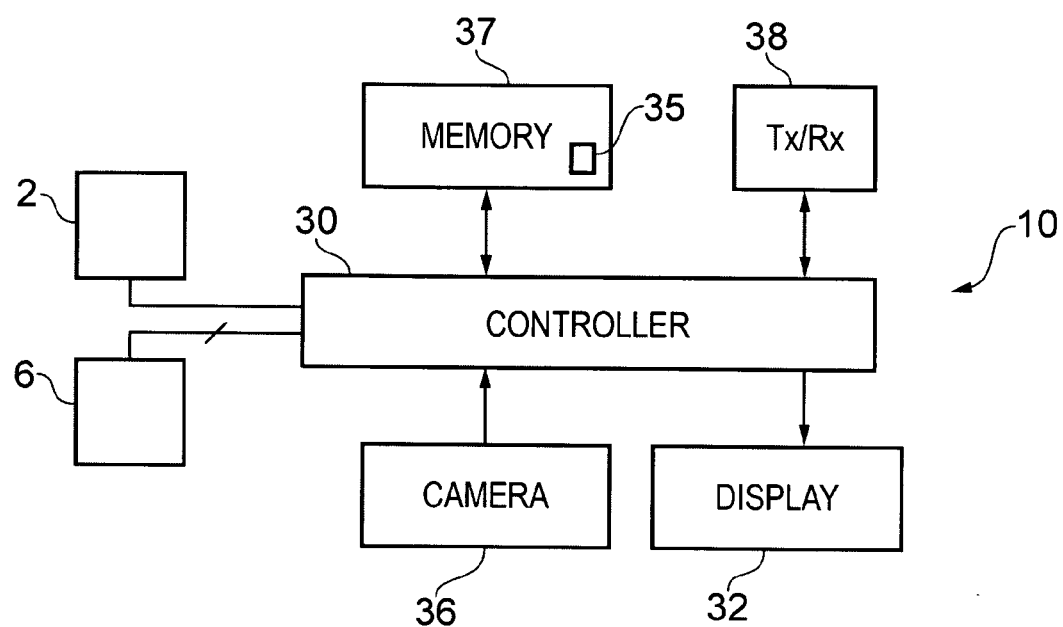

For a better understanding of various examples of embodiments of the present invention, reference will now be made by way of example only to the accompanying drawings, in which:

FIG. 1 schematically illustrates using functional components, an example of an apparatus;

FIG. 2A schematically illustrates an example of a first applied periodic potential difference;

FIG. 2B schematically illustrates an example of a second applied periodic potential difference;

FIG. 3 schematically illustrates a cross-section through an example of an apparatus 10;

FIG. 4 schematically illustrates use of an apparatus;

FIG. 5 schematically illustrates an example embodiment of the apparatus;

FIG. 6 schematically illustrates a method; and

Figure 7:
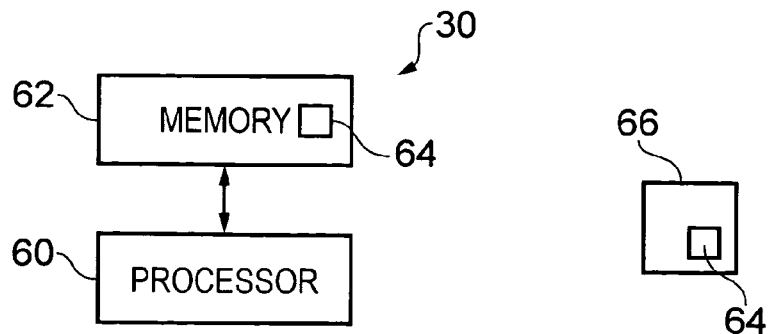

FIG. 7 schematically illustrates an example of one implementation of a controller for the apparatus.

DETAILED DESCRIPTION

The Figures illustrate examples of an apparatus 10 comprising: a first surface electrode 2 and an arrangement 6 of second insulated surface electrodes 4; a display 32 configured to display an image; and a controller 30 configured to apply a varying potential difference 24 between the first surface electrode 2 and the arrangement of second insulated surface electrodes 4 in dependence upon the displayed image.

In use, one portion of the user's body contacts the first surface electrode 2 and another portion of the user's body, preferably a digit, contacts or comes close to contacting the second insulated surface electrode 4 presented on a face 12 of the apparatus 10. The two points of contact close a local electric circuit via the user's body.

Each second insulated surface electrode 4 has an associated electric field. The electric field produces a force that does not directly create a touch stimulus at the overlying digit of a user when the digit is stationary but does provide a touch stimulus indirectly when the digit of the user is traced over the face of the apparatus.

Modulation of the force may, for example, be achieved by modulating the shape of the stimulating electric signals (e.g. H/W/T parameters, amplitude, width and the pulse density) of the potential difference applied to a second insulated electrode 4 as a user's digit is traced over the second insulated electrode 4. As the user's digit is moved over the (single) second insulated electrode it experiences a spatially varying touch stimulus.

Modulation of the force may alternatively or additionally be achieved, for example, by using the movement of the user's digit from a first insulated electrode 4 to a neighboring but distinct second insulated electrode 4' to modulate (spatially vary) the electric field applied to the moving user digit. The controller 30 is configured to apply a potential difference at one of the neighboring insulated electrodes 4 and a second, different, potential difference at a second neighboring insulated electrode 4'. As the user's digit is moved over the arrangement 6 of insulated electrodes it experiences a spatially varying touch stimulus.

It is believed that in both examples the varying force modulates the frictional force applied to the touching digit, which creates a modulating shear force at the surface of the digit when the digit is traced over the arrangement 6 of second surface electrodes 4. The varying touch stimulus perceived by the user as the digit is traced over the arrangement of second insulating electrodes creates a perceived 'texture' that can be modified by controlling at least the variation of the applied potential difference e.g. the frequency of the applied potential difference.

In this document the term 'electrically modulated moving touch stimulus'(EMMTS) will denote a touch stimulus at a user's body part that is controlled using an apparatus to apply a potential difference that is perceptible to a user when there is relative motion between the body part and the apparatus while there is touch contact between the body part and the apparatus, but is not perceptible to a user when there is not relative motion between the body part and the apparatus while there is touch contact between the body part and the apparatus.

The current that flows as a consequence of the applied potential difference is typically less than 5 µA, which is less than the current required for direct activation of nerves or muscle.

EMMTS may therefore be viewed as electrically modulating a nerve stimulation created by an alternative method (e.g. dragging a digit over the face).

FIG. 1 schematically illustrates an example of some functional components of an apparatus 10.

The apparatus 10 comprises, at a face 12, a first electrode 2, and an arrangement 6 comprising one or more insulating electrodes 4. The apparatus 10 also comprises a controller 30 and a display 32. In this example the first surface electrode 2 is connected to a reference ground or earth 34.

The controller 30 is configured to apply a varying potential difference between the arrangement 6 of second insulated surface electrodes 4 and the grounding first surface electrode 2. The controller 30 is also configured to control at least the variation in the potential difference.

The controller 30 may, for example, be configured to apply a time varying potential difference at a second insulated electrode 4. A user's digit moved over that second insulated electrode experiences a spatially varying touch stimulus. The spatially varying touch stimulus may be controlled by varying how the applied potential difference varies with time and the actual position of the user digit on the interaction surface The controller 30 may, for example, be configured to apply a first potential difference at a first one of neighboring but distinct second insulated electrodes 4 and a second, different, potential difference at the second one of the neighboring but distinct second insulated electrodes 4. A user's digit moved from one neighboring second insulated electrode to the other neighboring second insulated electrode (with or without an intervening portion of the first electrode) experiences a spatially varying touch stimulus. The spatially varying touch stimulus may be controlled by varying which potential difference is applied to which second insulated electrode at which time.

If the controller 30 is configured to apply a potential difference to multiple second insulating surface electrodes 4 then it may be configured to provide a different potential difference to each of the multiple second insulated surface electrodes 4'. It may also be configured to individually and independently control the time variations in the different potential differences.

The system operates in a regime which is using 1-100 µA. When the controller 30 is applying a potential difference to enable EMMTS the electric current flow via the surface electrode may be controlled so that it does not exceed 100 µA.

FIGS. 2A and 2B schematically illustrates examples where the potential difference 24A, 24B is time varying. The potential difference is a series of top-hat pulses separated by periods T including gaps 26. Each pulse can be characterized by its height H and its width W. The train of pulse can be characterized by {H, W, T}.

The controller 30 may for example control the time variation in the potential difference by controlling one or more of H, W, T. The train of pulses can then be characterized by {H(t), W(t), T(t)}, where H(t) indicates time variation of the pulse height, W(t) indicates time variation of the pulse width and T(t) indicates time variation of the pulse period.

FIG. 2A schematically illustrates examples where the potential difference 24A is a series of regular top-hat pulses separated by regular fixed periods T including regular fixed gaps 26. Each pulse can be characterized by a fixed height H and a fixed width W. The train of pulse can be characterized by {H, W, T}, where H, W, T are constants.

FIG. 2B schematically illustrates examples where the potential difference 24B is a series of irregular top-hat pulses separated by irregular fixed periods T including irregular fixed gaps 26. Each pulse can be characterized by a time variable height H(t) and a time variable width W(t). The train of pulse can be characterized by {H(t), W(t), T(t)}, where one or more of H(t), W(t), T(t) vary in time.

In other implementations, the potential difference may be a sinusoid signal which is then characterized by {H(t), T(t)}.

In this example, the controller 30 has controlled the time variation in the potential difference by increasing the frequency of the periodic potential difference between FIGS. 2A and 2B and has introduced variations to the H, W, T that change over time.

It is believed that it is the change in electric field/frictional force generated by the potential difference that has most effect on user perception. Therefore, top-hat pulses as illustrated in FIGS. 2A and 2B may be preferred because the rapid increase in potential difference creates an impulse modulation that is easily perceived using EMMTS. Furthermore, the separation between the impulses creates a periodic surface 'texture' that is dependent upon the period T(t) and the speed of movement of a user's digit. The controller 30, by time modulating T(t), can therefore convey information to a user using EMMTS The stimulating signals can be uni-polar or bi-polar. Although the signal shapes illustrated in FIG. 2 are uni-polar bi-polar signals may also be used. Bi-polar signals may have similar shapes but have pulses with negative potential (e.g. −H(t)). Typically uni-polar stimulation is more efficient and is better perceived.

FIG. 3 schematically illustrates a cross-section though a face 12 of one example of the apparatus 10.

In this example, the second insulated surface electrode 4 overlies a substrate 21. The second insulated surface electrode 4 comprises a continuous conductive layer 20 that overlies a substrate 21 and a dielectric layer 22 that overlies the conductive layer 20. The dielectric layer 22 insulates the conductive layer 20 creating an 'insulated' surface electrode 4. Consequently, when a user touches an upper surface 14 of the second insulated surface electrode 4 there is no galvanic connection between the conductive layer 20 and the user.

The substrate 21 may be any arbitrary substrate that will support the conductive layer 20. In some embodiments, it may be flexible; in other embodiments, it may be the body 11 of the apparatus 10. It may, for example, be a transparent and flexible polymeric film overlying a display 32.

The conductive layer 20 may be formed from any suitable conducting material. It may, for example, be formed from metal such as aluminum (Al), copper (Cu), gold (Au), silver (Ag) etc. It may for example be a transparent conducting oxide such as indium-tin-oxide (ITO), fluorine doped tin oxide (FTO), aluminum doped zinc oxide (AZO). It may be a transparent metallic mesh utilizing thin wires of aluminum (Al), copper (Cu), gold (Au), silver (Ag), etc., where the wires are fine enough not to be seen, and the open aperture sufficient to give optical transparency. It may be formed from carbon nanotubes or graphene, or silver nanowires, or a transparent conducting polymer material such as polythiophene or poly (3,4-ethylenedioxythiophene) (PEDOT). In some embodiments, the material and thickness of the conductive layer may be chosen so that it is substantially optically transparent and a body of the apparatus 10, which acts as substrate 21, can be viewed through it. In other embodiments, the body may be metallic and provide the conductive layer 20 without a substrate 21.

The dielectric layer 22 may be a dielectric layer with preferably a high relative permittivity such as hafnium oxide ($HfO_2$), aluminum oxide ($Al_2O_3$) and titanium dioxide ($TiO_2$), barium or strontium titanate etc. Alternatively, dielectrics with lower relative permittivity may be used. The dielectric layer may provide a hard, smooth surface. The dielectric layer may also be provided with a surface texture to enhance user perception.

The dielectric layer 22 may in some embodiments be optically transparent. It may be thin; for example, it may be 1 to 20 μm thick.

The combination of the first conductive layer 20, the dielectric layer 22 and the substrate 21 (if present) may be flexible.

In this example, the first surface electrode 2 is positioned on top of a portion of the dielectric layer 22. The first surface electrode 2 may be optically transparent. The first surface electrode 2 may be a galvanic surface electrode and is formed from an exposed conductive track 24 (no dielectric covering), so that when a user touches the first surface electrode 2 there is a galvanic connection between the conductive track 24 and the user.

The first surface electrode 2 may be formed from a network of electrically interconnected thin elongated conductive tracks. The tracks are sized and positioned relative to each other at the face such that a user digit placed on the face will contact at least one track and will continue to contact at least one track as it is traced over the face.

In other examples, the first surface electrode 2 may be positioned away from the face 12 comprising the arrangement 6 of second insulated electrodes 4.

A second insulated surface electrode 4 may extend over the face 12 in at least one direction a distance that is sufficient to allow a digit of a user to be physically traced in that direction. The extension of the second insulated surface electrode 4 in that direction is sufficient, bearing in mind the rate at which a time varying potential varies in time, to allow a user to trace their digit over the second insulated surface electrode 4 at a reasonable rate and be able to feel the modulations. If periodic modulations are used, it may be necessary to have greater extension for lower frequency ranges. The extension is sized and the time variation of the potential difference is controlled to provide to a digit of a user that is traced across the second insulated surface electrode a time varying touch stimulus.

The second insulated surface electrode 4 may be a patch that is designed such that EMMTS can be achieved irrespective of the direction in which a digit contacting the patch is traced across the surface of the patch.

FIG. 4 schematically illustrates a possible mode of use of one example apparatus 10. In this example, the apparatus 10 is a hand-portable electronic apparatus 50. The user 52 holds the apparatus 10 using a hand 54. When held, the finger 46 of the user's hand 54 contacts the first surface electrode 2 at the face 12 of a display 32, and contacts or nearly contacts a second insulated electrode 4 at the face 12. The user 52 is able to trace the tip of the finger 46 over the second insulated surface electrode 4 while it is in contact with the tracks of the first surface electrode 2. The controller 30 is simultaneously applying a time varying potential difference between the second insulated surface electrode 4 and the first surface electrode 2, which the user perceives as 'texture' via EMMTS.

The controller 30, by controlling the time variation in the potential difference, can convey information to a user. Referring back to FIGS. 2A and 2B, for example, a change in the periodicity of the pulses 25 changes the periodicity of the 'texture' perceived at a user's digit using EMMTS.

Referring back to FIG. 1, 'texture' may be controlled by the controller 30 according to the images displayed in the display 32.

The controller 30 is configured to control a variation in a potential difference applied between the first surface electrode 2 and the arrangement 6 of second insulated surface electrodes 4.

The controller 30 may be configured to apply a time varying potential difference between at least one second insulated surface electrode 4 and the first surface electrode 2. In this circumstance, at least one second insulated surface electrode 4 is configured, and the controller is configured to control the time variation of the potential difference to provide to a digit of a user that is traced across the second insulated surface electrode 4 a spatially varying touch stimulus. The arrangement 6 of second insulated surface electrodes 4 may consist of only a single second insulated surface electrode 4, where texture is generated only via time-variation of the applied potential difference.

Alternatively, the arrangement 6 of second insulated surface electrodes 4 may consist of multiple spatially distributed distinct second insulated surface electrodes 4, and the controller 30 may be configured to apply a spatially varying potential difference by applying different potential differences between the first surface electrode 2 and each of the spatially distributed distinct second insulated surface electrodes 4. The controller 30 is thus configured to control the potential difference applied at the arrangement 6 of second insulated electrodes 4 to provide to a digit of a user that is traced across the spatially distributed second insulated surface electrodes 4 a spatially varying touch stimulus.

The display 32 and the arrangement 6 of second insulated surface electrodes 4 may be collocated. The controller 30 may be configured to control the applied potential difference for the arrangement 6 of second insulated surface electrodes 4 to attribute different touch stimulus textures to visually different portions of the displayed image. Thus the controlled applied potential difference provides to a digit of a user when it is at a particular location a particular touch stimulus corresponding to a portion of the displayed image that underlies the particular location.

Typically, each image is processed to determine a mapping between digit position and potential difference. In one embodiment, the mapping is used by the controller 30 to generate at least a time varying potential difference at a second insulated electrode 4. In another embodiment, the mapping is used by the controller 30 to generate different potential differences at different neighboring second insulated electrodes 4.

The mapping may be produced by, for example: processing an image to assign a particular touch stimulus to each one of a plurality of non-overlapping image portions; and determining the mapping between image portion position and required potential difference for the particular touch stimulus.

The mapping defines the manner in which the applied potential difference applied to the arrangement 6 of second insulated electrodes 4 should be controlled by the controller 30 to achieve the assigned touch stimulus at each image portion when a digit of a user is traced across the arrangement 6 of second insulated surface electrodes 2 overlying the displayed image.

The mapping may be used to apply different potential differences at different spatially distributed second insulated electrodes 4 to attribute different touch stimulus textures to visually different portions of the displayed image.

Alternatively, the mapping may be used to generate a time varying potential difference applied at a second insulated electrode 4 to attribute different touch stimulus textures to visually different portions of the displayed image, assuming a particular speed of movement of the digit over the image. The position of a user's digit is estimated assuming the particular speed and the corresponding potential difference defined by the mapping is applied to the second insulated electrode 4. The corresponding potential difference may be a constant value or a time varying value such as a periodic value.

Alternatively, the mapping may be used to dynamically generate a time varying potential difference applied at a second insulated electrode. The position of a user's digit is detected and the corresponding potential difference defined by the mapping is applied. The corresponding potential difference may be a constant value or a time varying value such as a periodic value. This attributes different touch stimulus textures to visually different portions of the displayed image. The detection of a position of user's digit may be detected using touch screen technology. The display 32 may, for example, be a touch screen display.

The image may be processed using any suitable image processing technique. For example an image may be digitally processed by filtering the image, sampling the filtered image, and quantizing the sampled filtered image.

For example, if the image is presented using a Bayer pattern of colored outputs, the green output only may be selected for further processing (filtering and/or sampling and/or quantizing). Alternatively, only the blue output or only the red output may be selected.

For example, the image luminance may be subjected to thresholding. All values at or below a luminance $T_{low}$ may be assigned a fixed value $L_{low}$. Additionally or alternatively, all values at or above a luminance $T_{high}$ may be assigned a fixed value $L_{high}$. The luminance values may then be sampled and quantized.

Alternatively, a stored look-up table may be used to convert image luminance/chrominance to predetermined values on a pixel by pixel basis or on a pixel group by pixel group basis. Pixel groups may, for example, be determined using edge detection techniques.

The thresholds and the assigned luminance values may be dynamically determined on a global scale by, for example, averaging luminance over the whole image, or may be dynamically determined on a local scale by, for example, averaging luminance over a local portion of the image. Thus the filter may be a dynamic filter that varies spatially and/or temporally.

FIG. 5 schematically illustrates an example of an apparatus 10. This apparatus 10 is similar to that illustrated in FIG. 1 and similar reference numerals are used to designate similar features. However, the apparatus 10 additionally comprises a digital camera 36 which is configured to capture images and provide them to the controller 30 for processing to form and store a mapping 35 (as previously described) in memory 37. An image processed by controller 30 to form and store a mapping 35 may alternatively or additionally be provided from an external source via a communication interface 38. In this example, the communications interface is a radio transceiver and operates as an input communications interface and also as an output communications interface.

The controller 30 is configured to prepare a message for transmission via the output communication interface 38 comprising data defining an image for display and stimulus data assigning different touch stimulus textures to visually different portions of the image. The stimulus data may be the above described mapping 35 assigning potential differences defining a spatially varying touch stimulus.

FIG. 6 schematically illustrates a method 70.

At block 71, the controller 30, displays an image.

At block 72, the controller 30, applies a varying potential difference between a first surface electrode 2 of an apparatus 10 and an arrangement 6 of second insulated surface electrodes 4 of the apparatus 10. The potential difference may be time-varying, spatially varying or time-varying and spatially-varying.

At block 74, the controller 30 controls the varying applied potential difference in accordance with the displayed image. The variation may be a variation over time and/or space.

FIG. 7 schematically illustrates an example of one implementation of a controller 30 for the apparatus 10. The controller 30 comprises a processor 60 and a memory 62. It also comprises a signal generator controlled by the processor 60 to apply different time varying potential differences across one or more second insulated surface electrodes 4 and the reference electrode 2.

The processor 60 is configured to read from and write to the memory 62. The processor 60 may also comprise an output interface via which data and/or commands are output by the processor 60 and an input interface via which data and/or commands are input to the processor 60.

The memory 62 stores a computer program 64 comprising computer program instructions that control the operation of the controller 30 when loaded into the processor 60. The computer program instructions 64 provide the logic and routines that enables the apparatus to perform the methods illustrated in FIG. 6. The processor 60, by reading the memory 62, is able to load and execute the computer program 64.

The computer program may arrive at the controller 30 via any suitable delivery mechanism 66. The delivery mechanism 66 may be, for example, a computer-readable storage medium, a computer program product, a memory device, a record medium such as an article of manufacture that tangibly embodies the computer program 64. The delivery mechanism may be a signal configured to reliably transfer the computer program 64.

Although the memory 62 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor', etc., should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer programs, instructions, code, etc., should be understood to encompass software for a programmable processor or firmware such as, for example, the programmable content of a hardware device, whether instructions for a processor, or configuration settings for a fixed-function device, gate array or programmable logic device, etc.

The controller 30 may be provided as a module.

The combination of the display 32 and the arrangement 6 of second insulated surface electrodes 4 may be provided as a module for attachment as a display of any apparatus 2. The module may additionally comprise the first electrode 2.

Alternatively, the combination of the first surface electrode 2, and the second insulated surface electrode 4 and the substrate 21 may be provided as a module for attachment to an apparatus 10, e.g., for attachment to a display 32 of an apparatus.

As used here 'module' refers to a unit or apparatus that excludes certain parts/components that would be added by an end manufacturer or a user.

The blocks illustrated in the FIG. 6 may represent steps in a method and/or sections of code in the computer program 64. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Although in some embodiments the first surface electrode 2 is a galvanic surface electrode and is formed from an exposed conductive track 24 (no dielectric covering), in other embodiments it is an insulated surface electrode and is formed from a conductive track 24 that is wholly or partially covered by dielectric so that when a user touches the first surface electrode 2 there is not a galvanic connection but a capacitive connection between the conductive track 24 and the user. The dielectric material may be thin (1-20 micron thick) and not necessary optically transparent. However the size/shape/placement of the electrode 2 plays a role (because of capacitive coupling channel to the user palm). So the solution is easier if the common electrode 2 has galvanic contact with the user.

Features described in the preceding description may be used in combinations other than the combinations explicitly described.

Although functions have been described with reference to certain features, those functions may be performable by other features, whether described or not.

Although features have been described with reference to certain embodiments, those features may also be present in other embodiments, whether described or not.

Whilst endeavoring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

We claim:

1. An apparatus comprising:
   a first surface electrode and an arrangement of second insulated surface electrodes;
   a display configured to display an image; and
   a controller configured to apply a potential difference between the first surface electrode and the arrangement of second insulated surface electrodes, and configured to control at least a variation in the applied potential difference in dependence upon the displayed image, wherein the applied potential difference is configured to provide a touch stimulus by modulating a frictional force applied to a digit of a user when the digit, contacting a face of the apparatus, is traced over the face.

2. An apparatus as claimed in claim 1, wherein the controller is configured to control the applied potential difference for the arrangement of second insulated surface electrodes to attribute different touch stimulus textures to visually different portions of the displayed image.

3. An apparatus as claimed in claim 1, wherein the controller is configured to control the applied potential difference to provide to the digit of the user that is traced across the arrangement of second insulated surface electrodes a spatially varying touch stimulus, wherein the controlled applied potential difference provides to the digit of the user when it is at a particular location a particular touch stimulus corresponding to a portion of the displayed image that corresponds to the particular location.

4. An apparatus as claimed in claim 3, wherein the particular location overlies the corresponding portion of the displayed image.

5. An apparatus as claimed in claim 3, wherein, for each different displayed image, a different mapping between digit position and time varying potential difference is used.

6. An apparatus as claimed in claim 5, wherein an image is processed to determine its respective mapping between digit position and time varying potential difference.

7. An apparatus as claimed in claim 6, wherein an image is digitally processed by filtering the image and quantizing the filtered image.

8. An apparatus as claimed in claim 1, wherein the controller is configured to:
   process an image to assign a particular touch stimulus to each one of a plurality of non-overlapping image portions; and
   determine the manner in which the applied potential difference should be controlled by the controller to achieve the assigned touch stimulus at each image portion when the digit of the user is traced over the arrangement of second insulated surface electrodes overlying the displayed image.

9. An apparatus as claimed in claim 1, further comprising a digital camera for capturing the displayed image.

10. An apparatus as claimed in claim 1, further comprising an output communication interface, wherein the controller is configured to prepare a message for transmission via the output communication interface comprising data defining an image for display; and data assigning different touch stimulus textures to visually different portions of the image.

11. An apparatus as claimed in claim 1, further comprising an output communication interface, wherein the controller is configured to prepare a message for transmission via the output communication interface comprising data defining an image for display; and data assigning potential differences defining a spatially varying touch stimulus.

12. An apparatus as claimed in claim 1, wherein the controller is configured to apply a time varying potential difference between at least one second insulated surface electrode and the first surface electrode.

13. An apparatus as claimed in claim 12, wherein the at least one second insulated surface electrode is configured and the controller is configured to control the time variation of the potential difference to provide to the digit of the user that is traced over the second insulated surface electrode a spatially varying touch stimulus.

14. An apparatus as claimed in claim 12, wherein the arrangement of second insulated surface electrodes consists of a single second insulated surface electrode.

15. An apparatus as claimed in claim 1, wherein the arrangement of second insulated surface electrodes consists of multiple spatially distributed distinct second insulated surface electrodes and wherein the controller is configured to apply a spatially varying potential difference using the first surface electrode and the spatially distributed distinct second insulated surface electrodes.

16. An apparatus as claimed in claim 15, wherein the controller is configured to control the potential difference to provide to the digit of the user that is traced over the spatially distributed second insulated surface electrodes a spatially varying touch stimulus.

17. An apparatus as claimed in claim 1, wherein the display and the arrangement of second insulated surface electrodes are collocated.

18. A method comprising:
    displaying an image;
    applying a varying potential difference between a first surface electrode of an apparatus and an arrangement of second insulated surface electrodes of the apparatus; and
    controlling at least a variation in the applied potential difference in dependence upon the displayed image, wherein the applied potential difference is configured to provide a touch stimulus by modulating a frictional force applied to a digit of a user when the digit, contacting a face of an apparatus, is traced over the face.

19. A method as claimed in claim 18, comprising controlling the variation of the potential difference to provide to the digit of the user that is traced over at least part of the arrangement of second insulated surface electrodes a spatially varying touch stimulus.

20. A method as claimed in claim 18, comprising controlling the variation of the potential difference for the arrangement of second insulated surface electrodes to attribute different touch stimulus textures to visually different portions of the displayed image.

21. A method as claimed in claim 18, further comprising:
    processing an image to assign a particular touch stimulus to each one of a plurality of non-overlapping image portions; and
    determining the manner in which the potential difference should be controlled by the controller to achieve the assigned touch stimulus at each image portion when the digit of the user is traced over the arrangement of second insulated surface electrodes overlying the displayed image.

22. A method as claimed in claim 18, wherein the touch stimulus is perceptible to the user when the digit contacts and is traced over the face, but is not perceptible to the user when the digit contacts and is not traced over the face.

23. An apparatus comprising:
    a first surface electrode and a plurality of second insulated surface electrodes distributed over an area;
    a controller configured to apply a different potential difference between the first surface electrode and each of the plurality of second insulated surface electrodes and configured to control a spatial variation in the applied potential difference over the area, wherein the applied potential difference is configured to provide a touch stimulus by modulating a frictional force applied to a digit of a user only when the digit, contacting a face of the apparatus, is traced over the face, wherein the touch stimulus spatially varies across the area.

24. An apparatus as claimed in claim 23, further comprising a display, wherein the spatial variation of the touch stimulus is dependent upon an image displayed in the display.

* * * * *